Figure 2:
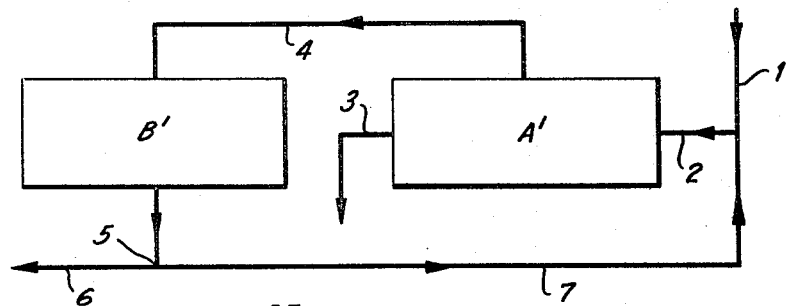

July 25, 1967   O. AULE   3,332,615

METHOD AND APPARATUS FOR PRODUCING BUTTER OIL

Filed June 4, 1964

INVENTOR.
Olaf Aule
BY
Davis, Hoxie, Faithfull & Hapgood
ATTORNEYS.

United States Patent Office 3,332,615
Patented July 25, 1967

---

3,332,615
METHOD AND APPARATUS FOR PRODUCING BUTTER OIL
Olaf Aule, Bandhagen, Sweden, assignor to Aktiebolaget Separator, Stockholm, Sweden, a corporation of Sweden
Filed June 4, 1964, Ser. No. 372,548
Claims priority, application Sweden, June 12, 1963, 6,504/63
7 Claims. (Cl. 233—19)

The production of butter oil has heretofore been carried out generally by one of three different methods. According to the original method, which probably is also the most commonly used at present, cream is separated from milk and is churned, with or without kneading, to butter which is finally melted to form butter oil. According to another method the milk is separated to obtain cream with a fat content of about 45%, which emulsion of fat in water is phase-inverted into an emulsion of water in fat and thereafter concentrated, whereby butter oil with a fat content of about 80% is obtained. In a third method the milk is separated to obtain cream with a fat content of about 40% which is concentrated to a fat content of about 80% and finally phase-inverted into butter oil with a fat content of about 80%.

In all three of these methods the process is carried out in separate stages which are effected at different times and in separate apparatus, whereby the processed substance often must be heated or cooled when passing from a stage to another. For example, when producing butter oil according to the first-mentioned, original method, it is first necessary to heat the milk in a separate preheater, whereupon the heated milk is separated in a centrifugal separator. The separated cream must thereafter be cooled in a separate cooler and then churned to butter in a separate butter churn, with or without kneading of the butter. The butter must finally be heated and melted in a further apparatus in order to obtain butter oil with the intended composition.

It is quite evident that the production of butter oil according to any of the above-mentioned prior methods is time-consuming, requires a rather intricate set of equipment, and is unsatisfactory in terms of heat economy.

The principal object of the present invention is to provide a method and apparatus which eliminate the above-noted drawbacks.

According to the invention, the butter oil is produced by separation and concentration of a milk product (milk or cream) in a centrifuge and phase-inversion of a thus formed fat in-water emulsion with a low fat content into a water-in-fat emulsion with a high fat content. The main advantages of the invention, as compared wtih methods and apparatus known heretofore, are a considerable saving of time, which means a higher throughput capacity for a plant of a given size, as well as a simplified set of equipment and particularly a highly improved heat economy.

In the practice of the new method, the separation and the concentration as well as the phase-inversion are carried out continuously at substantially the same temperature, while a part of the butter oil obtained as a result of the phase-inversion is reconveyed to the inlet of the centrifuge. The in-flowing substance (milk or cream) is preferably fed at a temperature of 40° to 65° C. which remains practically constant during the whole process, with no need for supplying or extracting heat. It is very important that a part of the butter oil formed be reconveyed to the inlet of the centrifuge, since this circulation of butter oil sustains the phase-inversion step and also causes a higher fat content in the water-in-fat emulsion resulting from the phase-inversion and thus a higher fat content in the final product recovered (the butter oil).

According to the present invention, the phase-inversion step may be started in two different ways. It may be started by feeding pure water into the centrifuge when the latter is started, whereupon milk or cream is fed in such quantity that a phase-inversion occurs and thereafter milk or cream is supplied continuously. Alternatively, the phase-inversion is started by feeding butter oil into the centrifuge when the latter is started, preferably together with milk or cream.

An apparatus made according to the invention comprises a centrifugal separator having a part for separation and concentration of cream and a part for its phase-inversion, conveying means for the supply of milk or cream to the separation and concentration part and for discharge of skim-milk therefrom, conveying means for the transfer of fat-in-water emulsion from the latter part of the centrifuge to its phase-inversion part, and conveying means for the discharge of a part of the butter oil formed from the phase-inversion part of the centrifuge and for reconveying the remainder of the butter oil to the separation and concentration part.

According to one embodiment of the invention, the separation and concentration part and the phase-inversion part of the centrifuge are firmly connected to each other and together form the rotor of the centrifugal separator. According to another embodiment, both parts are essentially separated and are interconnected only by conveying means for fat-in-water emulsion and reconveyed butter oil.

In both embodiments, the phase-inversion part is constituted by a so-called paring chamber which is provided with one or several homogenization disks.

In the embodiment in which both parts together form the rotor of the centrifuge, the paring chamber is, of course, fastened to and driven by the same shaft as the separation and concentration part, whereby the homogenization disks are motionless in relation to the rest of the separator and its foundation.

In the embodiment in which both parts are substantially apart, the paring chamber may be motionless while the homogenization disks are caused to rotate by means of a special driving device. Alternatively, the paring chamber may be rotated and the homogenization disks held stationary.

Figure 1:
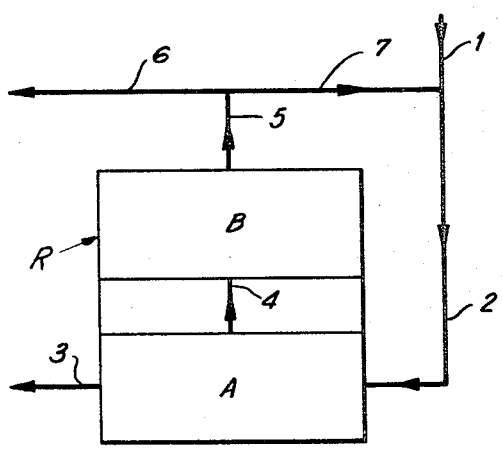

The invention is illustrated in the attached drawings wherein
FIG. 1 is a schematic view of the embodiment in which both parts together form the rotor of a centrifugal separator;
FIG. 2 is a similar view of the embodiment in which both parts are essentially separate, and
FIG. 3 is a vertical sectional view of one form of the centrifugal rotor which includes the separation and concentration part as well as the phase-inversion part.

Referring to FIG. 1, the apparatus there shown comprises a rotor indicated generally at R which forms a locus of centrifugal force having a cream separation and concentration part A and a phase-inversion part B. The milk or cream to be processed is fed through pipes 1 and 2, forming a conveying means, to the inlet of rotor part A where the feed is centrifugally separated into concentrated cream and skim-milk components. The skim-milk is discharged by conveying means in the form of a pipe line 3 leading from the rotor part or separating zone A. The concentrated cream (a fat-in-water emulsion) passes from the rotor part A through a conveying means 4 of the rotor into the phase-inversion zone at part B of the rotor. The rotor part B forms a rotary paring chamber containing stationary homogenizing disks which act on the fat-in-water emulsion from rotor part A to convert it into a water-in-fat emulsion or butter oil. This butter oil is discharged from rotor part B by conveying means in the form of a pipe 5. Part of the discharge butter oil is drawn off as final product through a pipe 6 while the rest of the butter oil is reconveyed to the rotor part A through a branch pipe 7 and the previously mentioned feed pipe 2.

Referring to FIG. 2, the centrifugal separation and concentration of the cream are effected in a separate rotor A1, to which the starting milk or cream is fed by the conveying means 1–2. The separated skim-milk and concentrated cream components of the feed are discharged at 3 and 4, respectively, the conveying means 4 in the instance leading externally of rotor A1 to a separate phase-inversion device B1. The latter comprises a paring chamber and a set of homogenizing disks, one of which is rotated relative to the other reverse the phase of the fat-in-water emulsion from rotor A1. The resulting butter oil discharged at 5 is partly withdrawn through pipe 6 and partly returned through branch pipe 7 and main feed pipe 2 to rotor A1.

Figure 3:
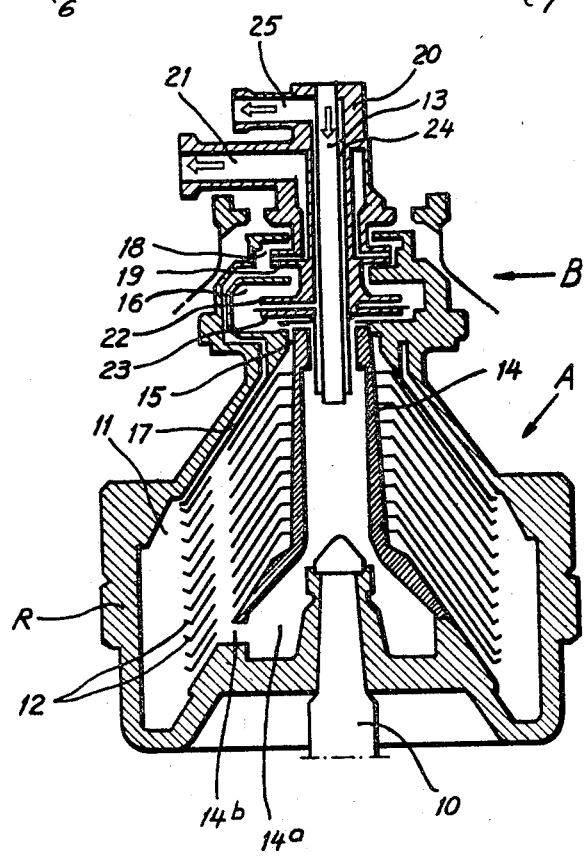

In FIG. 3, the centrifugal rotor R is driven about a vertical axis by a drive shaft 10 on which the rotor is mounted. The lower portion of the rotor forms a separating chamber 11 which may be referred to as a separation and concentration zone. The latter is provided with the usual set of conical disks 12. The milk or cream is fed to the rotor by way of a stationary feed tube 13 extending downwardly through the top of the rotor and into the usual distributor 14 thereof. The distributor forms with the bottom of the rotor a space 14a from which the feed enters the set of disks in separating chamber 11 by way of radial passages 14b.

The concentrated cream resulting from the separation in chamber 11 discharges upwardly and inwardly from the latter through passage 15 to a paring chamber 16 in the upper part B of the rotor, this chamber being referred to as a phase-inversion zone. The separated skim-milk flows upwardly through an outer passage 17 to a second paring chamber 18 located in the upper part of the rotor neck above the paring chamber 16. The skim-milk is discharged from chamber 18 by a paring device 19 in the form of the usual paring disk carried by a stationary fixture 20 which also supports the feed tube 13. This fixture has a skim-milk discharge passage 21 leading from the paring device 19.

Below the paring disk 19 the stationary fixture 20 supports a second paring disk 22 located in paring chamber 16. A phase-inverting device 23 is secured to the fixture 20 under the paring disk 22 and is in the form of a stationary horizontal disk having a serrated periphery which is completely immersed in the rotating body of liquid in paring chamber 16. Thus, the peripheral teeth of disk 23 create a cavitation effect and act to convert the concentration cream from a fat-in-water to a water-in-fat emulsion. The resulting butter oil is pared from chamber 16 by the disk 22 from which it discharges upwardly through an annular passage 24 formed by the feed tube 13 and a vertical bore of fixture 20, the latter having a butter oil discharge passage 25 leading from the upper end of annular passage 24.

As previously mentioned and indicated in FIG. 1, part of the butter oil discharged through passage 25 is returned to the feed tube 13 along with the feed of milk or cream.

The manner in which the invention may be practiced is shown in the following examples and accompanying details but it is to be understood that this exemplary matter is given by way of description only and is not to be considered as limiting the scope of the invention covered by the appended claims.

Example 1

When starting the apparatus according to the invention pure water was firstly supplied to fill the apparatus therewith. Then 50 kg. milk was supplied and the driving of the apparatus continued for five minutes during continuous supplying of water. The supply of water then was cut off and 5000 kg. milk per hour with a fat content of 4.2% was supplied continuously to the apparatus. The yield of the apparatus was 250 kg. of butter oil per hour with a fat content of 80%. Further, 4750 kg. per hour of skim-milk with a fat content of 0.2% was obtained. The temperature of the materials supplied as well as of the materials gained was about 55° C.

Example 2

When starting the apparatus the same was filled with pure water. Then 10 kg. of butter oil was supplied to the apparatus and thereafter continuously 5000 kg. per hour of cream with a fat content of 18.5% was added. The apparatus delivered 1000 kg. per hour of butter oil with a fat content of 80% and 4000 kg. of skim-milk with a fat content of 3%. The skim-milk was separated for recovering the fat contained therein. In this case, too, the temperature of the materials supplied and obtained was about 55° C.

I claim:
1. A method of producing butter oil which comprises the continuous steps of feeding a milk product to a separating zone in a locus of centrifugal force, centrifuging the product at a predetermined temperature in said locus to separate the product into a skim-milk component and a concentrated cream component in the form of a fat-in-water emulsion, passing the separated cream component from said separating zone to a phase-inversion zone and there converting it at substantially said temperature to a water-in-fat emulsion to form butter oil, discharging the butter oil from said phase-inversion zone, and returning part of the discharged butter oil to said separating zone.

2. A method according to claim 1, comprising also first feeding pure water and then milk product through said zones in such quantity that phase-inversion occurs, said milk product then being fed continuously to the separating zone.

3. A method according to claim 1, comprising also first feeding butter oil together with said milk product through said zones to start said phase-inversion.

4. Apparatus for producing butter oil, which comprises a centrifugal rotor defining a separating zone having separate outlets for skim-milk and concentrated cream, respectively, feed pipe means leading to the rotor for supplying a milk product to said zone, phase-inversion means having an inlet connected to said cream outlet of the separating zone, said phase-inversion means being operable to convert the cream from a fat-in-water to a water-in-fat emulsion and having an outlet line for discharge of said water-in-fat emulsion as butter oil, and a conveyor pipe branching from said outlet line and leading to said feed pipe means for returning part of the butter oil to said separating zone.

5. Apparatus according to claim 4, in which said rotor also defines a paring chamber having said inlet and forming part of said phase-inversion means, said phase-inversion means also including a phase-inverting device in the paring chamber.

6. Apparatus according to claim 4, in which said phase-inverting means include a paring chamber having said inlet and aphase-inverting disk in the paring chamber.

7. Apparatus according to claim 4, in which said phase-inverting means include a paring chamber having said inlet and an homogenizing disk in the paring chamber, said chamber being separate from the rotor, the apparatus also comprising a pipe leading from the rotor for connecting said cream outlet to said inlet.

References Cited

UNITED STATES PATENTS

| | | | |
|---|---|---|---|
| 1,413,092 | 4/1922 | Baker | 99—62 |
| 2,144,229 | 1/1939 | Ruda | 233—22 |
| 2,344,888 | 3/1944 | Lindgren | 233—21 |

M. CARY NELSON, *Primary Examiner.*

HENRY T. KLINKSIEK, *Examiner.*